Oct. 6, 1925.                                      1,556,557
A. DE PAEMELAERE
PATHFINDER
Filed July 6, 1923

Witness.
Wm Hall.

Inventor:
Arthur De Paemelaere
By Hazard and Miller
Attorneys

Patented Oct. 6, 1925.

1,556,557

UNITED STATES PATENT OFFICE.

ARTHUR DE PAEMELAERE, OF GARDENA, CALIFORNIA.

PATHFINDER.

Application filed July 6, 1923. Serial No. 649,793.

*To all whom it may concern:*

Be it known that I, ARTHUR DE PAEMELAERE, a citizen of the United States, residing at Gardena, in the county of Los Angeles and State of California, have invented new and useful Improvements in Pathfinders, of which the following is a specification.

My present invention is a "pathfinder" suitable for use upon automobiles, aeroplanes, and the like, in order to enable a driver or observer to determine just how his machine is pointed; and one preferred embodiment of my invention comprises both a compass and a clinometer cooperatively related in a single housing.

It is an object of this invention to provide a very compact instrument of the general character referred to, which shall be suitable to be secured to a dash or to any desired surface, under the eye of a driver or observer; and in one advantageous form of my invention I employ a housing adjustably secured to a bracket, and within this housing I may mount a compass needle upon a plate which is adapted to serve as a clinometer.

It is one object of this invention to provide a compass with an adjustable dial, this dial being preferably in the form of a glass cover upon one of whose surfaces indicia are provided in such manner as to permit, for example, a setting of "N" to the true north, regardless of the orientation of the housing of said compass or that of the vehicle to which it may be attached.

It is another object of this invention to provide a simple and advantageous means for determining approximately the actual inclination of a vehicle, that is, to show the grade that an automobile or the like may be taking, with reference to a selected plane, such as a horizontal plane, and, for this purpose, I may employ a disc mounted upon a horizontal axis within a housing such as a compass housing, this disc being preferably associated with a pendulum, and in one preferred embodiment of my invention the mentioned disc may be used as a support for a compass needle, suitable means being employed to retain all parts in their desired relationship, a luminous paint, or the like, being optionally employed to facilitate reading in the dark.

Other objects of my invention will appear from the following description of a preferred embodiment thereof, and from the appended claims, taken in connection with the accompanying drawings, in which Fig. 1 is a top plan view of a pathfinder of my preferred design, a fragment of a supporting member, such as a dash, being shown in section.

Figure 1:
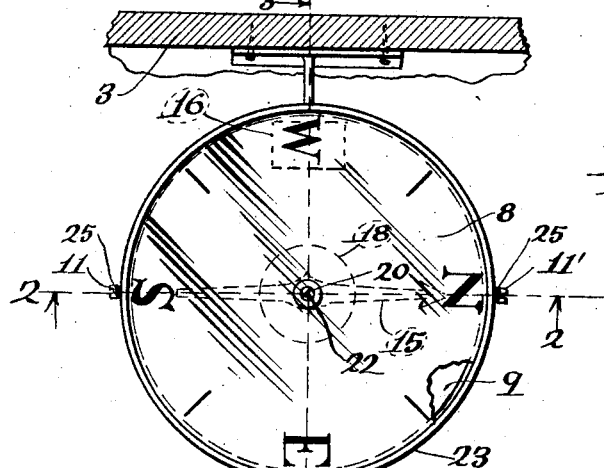
Figure 2:
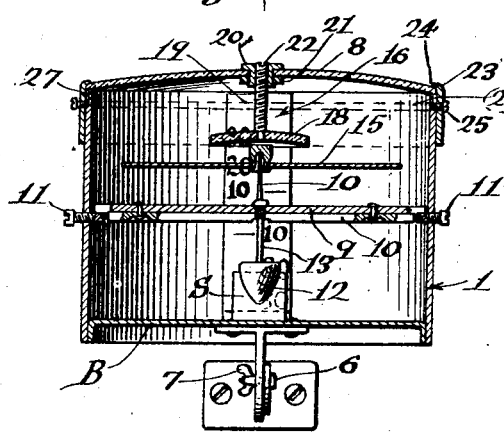
Fig. 2 is a vertical section on the line 2—2 of Fig. 1.

Referring to the details of that specific embodiment of my invention which I have chosen for purposes of illustration, 1 is a housing, which may be circular in cross section and which may be secured to a dash 3, or the like, by any suitable means such as an arm 4 to which a cooperating arm 5 may be pivotally secured by means such as a short bolt 6 carrying a wing nut 7, the housing 1 being preferably surmounted by a transparent cover in the form of a crystal 8.

Within the housing 1 the essential element of a clinometer and a compass may be supported in any suitable way; but I have shown my clinometer as comprising a circular plate 9, pivoted upon a horizontal axis 10 cooperating with pivot screws 11, 11' and as provided with a pendulum 12, integral therewith or secured thereto, the pendulum rod 13 being shown as substantially coaxial with a bearing pin 14, upon which a compass needle 15 may be pivoted in a usual or any preferred manner.

Figure 3:
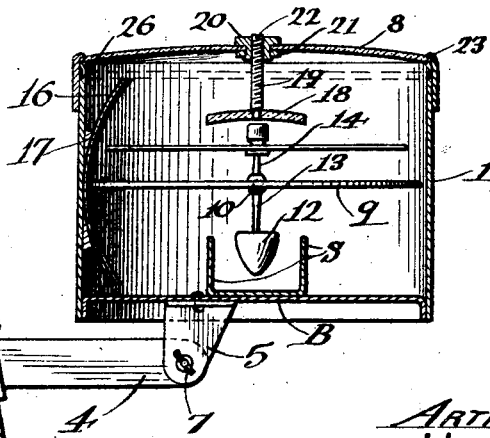
Fig. 3 is a vertical section on the line 3—3 of Fig. 1.

To enable the disk 9 to serve as a means of indicating the inclination of a vehicle or the like, in connection with which my pathfinder may be employed, a curved scale 16, preferably arcuate in cross section as best shown in Fig. 3, may advantageously be so secured to what I may term the back wall 17 of the housing 1 that the zero reading on said scale shall lie in the plane of the disc 9 whenever the housing 1, or the vehicle to which it may be attached, is level, or disposed with its longitudinal axis in a horizontal or other predetermined plane, additional figures being provided upon the scale 16 in such a manner that an angle of inclination or the degrees of a circular arc may be read off at a glance.

In order to retain the compass needle 15 in its intended position upon the pin 14, notwithstanding the vibrations or other motions to which a vehicle may be subjected, any suitable means may be provided, and I have suggested the employment, for this purpose, of a small transparent plate 18, secured adjacent thereto by means of a threaded pin 19, shown as extending through a bushing 20, with which a nut 21 is adapted to co-operate, the level of the transparent plate 18 being adjustable by a rotation of the pin 19, as by means of a nick 22 in the top thereof. To prevent damage to the mentioned parts incidentally to the unavoidable oscillations of the plate 9, stops S, or their equivalent, may optionally be rigidly secured to the base plate B, shown as supporting the housing 1, in such manner as to limit the oscillations of the pendulum 12, by which the horizontality of the plate 9 is normally maintained.

In order to facilitate the use of the described compass construction within a housing rigidly secured to a dash or the like, I prefer to provide the transparent cover or crystal 8 with securing means such as are adapted to facilitate a rotary adjustment of the said cover upon the housing 1, the said cover being preferably provided with the usual indicia, such as the marks "N," "S," "E," "W" upon one of the surfaces, and preferably upon the inner or lower surface thereof.

As a securing means permitting easy adjustment in the manner referred to, I may employ a collar 23, having a flange 24 adapted to overlie the edge of said crystal, and I may provide the mentioned collar with means such as the short screw or screws 25, adapted to enter a circumferential groove 26, near the top of the housing 1, this construction being such as to permit any desired degree of freedom of relative rotation between the housing 1 and the collar 23, although permitting of an entire removal of said cover, whenever the short screws 25 are suitably retracted or brought into alignment with vertical grooves 27, if such grooves are provided, to provide what may be regarded as a bayonet joint.

Although I have herein described one preferred embodiment of my invention, it should be understood that various features thereof might be independently employed, and also that various modifications might be made therein without departure from the spirit and scope of my invention as the same is indicated above and in the following claims.

What I claim is:

1. A cylindrical housing having a bottom, a circular plate pivotally mounted upon a horizontal diametrical axis in the housing, a pendulum extending downwardly from the center of the plate, and a curved scale mounted vertically upon the inner wall of the housing adjacent the periphery of the plate.

2. A cylindrical housing having a bottom, a circular plate pivotally mounted in the housing upon a horizontal diametrical axis, a curved scale mounted adjacent to the periphery of the plate, a pendulum extending downwardly from the center of the plate, a bearing pin extending upwardly from the center of the plate, a compass needle mounted upon the bearing pin, stops for limiting the movement of the pendulum, a transparent cover for the housing, a threaded pin mounted through the cover, and a transparent plate upon the lower end of the pin to hold the compass needle upon the bearing pin.

3. A housing in the form of a circular hollow cylinder having a flat bottom, an arm connected to the flat bottom, a second arm adjustably connected to the first arm and adapted to be attached to a supporter, a clinometer and compass mounted in the housing, a glass cover closing the upper end of the housing and having compass indices thereon, and a mounting securing the glass to the upper end of the housing adapted to permit rotation of the glass relative to the housing.

In testimony whereof I have signed my name to this specification.

ARTHUR DE PAEMELAERE.